US006743484B2

(12) United States Patent
Ott et al.

(10) Patent No.: US 6,743,484 B2
(45) Date of Patent: Jun. 1, 2004

(54) REACTIVE MIXTURES OF SUBSTANCES ON THE BASIS OF PROPARGYL-ALCOHOL BLOCKED POLYISOCYANATES, METHOD FOR PREPARING THE SAME AND THE USE THEREOF

(75) Inventors: Gunther Ott, Münster (DE); Georg Schön, Everswinkel (DE); Hardy Reuter, Münster (DE); Joachim Woltering, Münster (DE); Ulrike Röckrath, Senden (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/296,400

(22) PCT Filed: Jun. 29, 2001

(86) PCT No.: PCT/EP01/07425
§ 371 (c)(1),
(2), (4) Date: Nov. 25, 2002

(87) PCT Pub. No.: WO02/02665
PCT Pub. Date: Jan. 10, 2002

(65) Prior Publication Data
US 2003/0144383 A1 Jul. 31, 2003

(30) Foreign Application Priority Data
Jun. 30, 2000 (DE) ......................... 100 31 987

(51) Int. Cl.$^7$ .............................. B05D 3/02; B05D 3/06
(52) U.S. Cl. ...................... 427/493; 427/385.5; 528/45
(58) Field of Search ........................... 528/45; 427/493, 427/385.5

(56) References Cited

U.S. PATENT DOCUMENTS

| 4,294,940 | A | * | 10/1981 | Hino et al. ................ 525/124 |
| 4,444,954 | A | | 4/1984 | Mels et al. ................ 525/124 |
| 4,940,768 | A | | 7/1990 | Hönel et al. ................. 528/45 |
| 5,135,970 | A | | 8/1992 | Hönel et al. ............... 523/414 |
| 5,847,044 | A | | 12/1998 | Las et al. .................. 524/590 |
| 5,916,629 | A | | 6/1999 | Wenning et al. ......... 427/207.1 |

FOREIGN PATENT DOCUMENTS

| CA | 2084737 | 12/1992 |
| DE | 196 17 188 | 11/1997 |
| EP | 803 524 | 4/1997 |
| EP | 818 482 | 5/1997 |
| JP | 62-232424 | 10/1987 |

OTHER PUBLICATIONS

Database, WPI, Section Ch, Week 198746, Derwent Publications Ltd., London, GB; AN 1987–325268, XP002179431, & JP 62 232424 A (Showa High Polymer KK), Oct. 12, 1987.

English Language Abstract for DE19617188 Nov. 1997.

* cited by examiner

*Primary Examiner*—Erma Cameron

(57) ABSTRACT

Reactive compositions which consist of or comprise (A) at least one polyisocyanate whose isocyanate groups have been partly or fully blocked with propargyl alcohol, (B) at least one constituent which contains on average at least two isocyanate-reactive functional groups in the molecule, and (C) at least one catalyst which catalyzes the addition reaction of the isocyanate-reactive functional groups of (B) with the acetylenically unsaturated triple bond of the propargyl groups, and their use as coating materials, adhesives, and sealing compounds.

15 Claims, No Drawings

REACTIVE MIXTURES OF SUBSTANCES ON THE BASIS OF PROPARGYL-ALCOHOL BLOCKED POLYISOCYANATES, METHOD FOR PREPARING THE SAME AND THE USE THEREOF

The present invention relates to novel reactive compositions. The present invention also relates to the use of the novel reactive compositions as coating materials, adhesives and sealing compounds. The present invention further relates to a novel process for preparing coatings, adhesive layers, and seals, which process can be carried out with no emissions.

Blocked polyisocyanates and processes for their preparation have been known for a long time. Reference is made, for example, to U.S. Pat. No. 4,444,954 A. The blocked polyisocyanates are preferably used as crosslinking agents in externally crosslinking reactive compositions, especially coating materials, adhesives, and sealing compounds.

The use of propargyl alcohol as blocking agents for polyisocyanates is known from German Patent Applications DE 38 09 695 A 1, DE 39 32 816 A 1 or DE 41 42 734 A 1. The polyisocyanates, partially blocked with propargyl alcohol, are incorporated through the reaction of free isocyanate groups into binders, which become self-crosslinking as a result. The polyisocyanates fully blocked with propargyl alcohol serve as crosslinking agents in externally crosslinking reactive compositions.

Externally crosslinking is a term used to refer to those coating materials, adhesives, and sealing compounds in which one variety of the complementary reactive functional groups which bring about crosslinking is present in a binder and the other variety in a hardener, curing agent or crosslinking agent. Self-crosslinking coating materials, adhesives, and sealing compounds are those in which the complementary reactive functional groups are present in one constituent. For further details, reference is made to Rompp Lexikon Lacke und Druckfarben, Georg Thieme Verlag, Stuttgart, New York, 1998, "Curing", pages 274 to 276, especially page 275, bottom.

The crosslinking of the blocked polyisocyanates known from German Patent Application DE 38 09 695 A 1 is catalyzed by catalysts, such as salts or complexes of metals, such as lead, zinc, iron, tin, manganese, and bismuth, for example. Preferred metal catalysts in this context are lead compounds, such as lead carboxylates having from 1 to 10 carbon atoms, or tin compounds, such as dibutyltin diacetate, dibutyltin dilaurate or dibutyltin oxide. As is known, these catalysts accelerate the elimination of blocking agents from the blocked polyisocyanates and the reaction of isocyanate-reactive functional groups in the binders and/or reactive diluents with the formation of urethane, thiourethane and/or urea groups.

The disadvantage of this type of crosslinking is that volatile organic compounds are released which, if they remain in the resultant coats, adhesive films and seals, may adversely affect the profile of performance properties of said coats, adhesive films and seals or, if they depart the resultant coats, adhesive films and seals, constitute unwanted organic emissions.

Furthermore, the coats, adhesive films, and seals which comprise urethane, thiourethane and/or urea groups in their three-dimensional network, as far as pigmentability, leveling, hardness, flexibility, scratch resistance, chemical resistance, weathering stability, adhesion, and gloss are concerned, offer distinct advantages over coats, adhesive films, and seals based on a different crosslinking chemistry.

It would therefore be highly desirable to have available a reactive composition which could be cured without emission to give a three-dimensional network containing urethane, thiourethane and/or urea groups.

It is true that reactive compositions which may be cured without emissions and give three-dimensional networks containing urethane and/or urea groups have been known for a long time. However, these are straight two-component or multicomponent systems in which unblocked polyisocyanates are used as crosslinking agents. These cure even at room temperature. However, until shortly before the application, the high reactivity of the crosslinking agents means that they have to be stored separately from the other constituents of the composition, necessitating a more complex technology and logistics. Furthermore, this makes it very much more difficult, if not impossible, to prepare powder coating materials and powder coating dispersions (powder slurries).

It would therefore be particularly desirable to have available a one-component system which can be cured without emissions and where the crosslinking agents need not be stored separately from the other constituents.

European Patent Application EP 0 852 252 A1 discloses epoxy resins containing propargyl groups and amino groups. The propargyl-containing epoxy resins are used to prepare cathodically depositable electrodeposition coating materials, which are selfcrosslinking via amino groups and propargyl groups or via the acetylenically unsaturated bonds. The cathodically depositable electrodeposition coating material further comprises a constituent such as, for example, tetrabutylammonium bromide which, following its activation by the electrolysis, catalyzes the thermal curing of the deposited electrodeposition coating film. As a result, the electrodeposition coating film may be cured at comparatively low temperatures. If the electrodeposition coating material, however, is not applied electrophoretically but instead, for example, by knife-coating onto a substrate, the resultant coating film does not crosslink below 200° C.

It is an object of the present invention to provide new reactive compositions, especially coating materials, adhesives, and sealing compounds, particularly one-component coating materials, adhesives, and sealing compounds, which match if not exceed the technological profile of properties of the known reactive compositions and may be cured, moreover, without emissions. It should be possible to provide the new reactive compositions in the form of finely divided powders, powder slurries, aqueous solutions or dispersions, organic solutions or dispersions, or as essentially water-free and solvent-free liquid systems (100% systems).

It is another object of the present invention to find a new process for the thermal curing of reactive compositions comprising blocked polyisocyanates as crosslinking agents that proceed without emissions.

Furthermore, the new process and the new reactive compositions ought to make it possible to postcrosslink the resultant new coats, adhesive films, and seals with actinic radiation.

It is not least an object of the present invention to provide new coats, adhesive films, and seals which have a profile of performance properties which matches if not exceeds that of the known coats, adhesive films, and seals.

Found accordingly have been the novel reactive compositions which consist of or comprise (A) at least one polyisocyanate whose isocyanate groups have been partially or fully blocked with propargyl alcohol, (B) at least one constituent having on average at least two isocyanate-reactive. functional groups in the molecule, and (C) at least one catalyst which catalyzes the addition reaction of the isocyanate-reactive functional groups of (B) with the acetylenically unsaturated triple bond of the propargyl groups, and which are referred to below as "compositions of the invention".

Also [lacuna] has been the novel process for producing coatings, adhesive films, and seals by (I) applying coating materials, adhesives, and sealing compounds which consist of or comprise at least one composition of the invention onto and/or into a substrate, and (II) thermally curing the resultant films and/or compositions, In the text below, the novel process for producing coats, adhesive films, and seals is referred to as "curing process of the invention".

Further subject matter of the invention will emerge from the description.

In the light of the prior art it was surprising and unforeseeable to the skilled worker that the complex of objects on which the present invention was based could be solved through the compositions as claimed in the invention. It was also surprising that specifically the compositions of the invention make it possible to carry out the curing process of the invention without emissions. Surprisingly, the curing process of the invention gave coatings, adhesive films and seals which in the cured state could still be postcrosslinked with actinic radiation.

The compositions of the invention comprise polyisocyanates (A), partly or fully blocked with propargyl alcohol, as crosslinking agents.

The blocked polyisocyanates (A) may be partly blocked. This means that they still contain at least one free isocyanate group. This kind of blocked polyisocyanates is used in particular as intermediates for the controlled introduction of isocyanate groups blocked using propargyl alcohol into compounds comprising isocyanate-reactive functional groups, such as primary amino groups, hydroxyl groups and/or thiol groups, especially hydroxyl groups. This incorporation produces blocked polyisocyanates (A) which are of relatively high functionality and which—provided excess isocyanate-reactive functional groups are still present—have selfcrosslinking properties. Examples of suitable compounds of this kind are the reactive diluents and binders (B) described below.

The free isocyanate groups may further be blocked with customary and known blocking agents, so giving mixed-blocked polyisocyanates (A) which are used as crosslinking agents in the compositions of the invention that are one-component systems. This feature is employed in particular in order to realize special technical effects in the context of deblocking and crosslinking.

Moreover, the partly blocked polyisocyanates (A) may be used as crosslinking agents in the compositions of the invention that are two-component or multi-component systems.

Preferably, the blocked polyisocyanates (A) are fully blocked.

For the blocked polyisocyanates (A) it is essential that at least one isocyanate group is blocked with propargyl alcohol. In accordance with the invention it is of particular advantage if all isocyanate groups are blocked with propargyl alcohol.

Polyisocyanates suitable for blocking are virtually all customary and known aromatic, aliphatic and cycloaliphatic diisocyanates and polyisocyanates. Particularly suitable are the diisocyanates and polyisocyanates referred to in the art as paint polyisocyanates.

Examples of suitable aromatic diisocyanates for blocking are tolylene diisocyanate, xylylene diisocyanate, bisphenylene diisocyanate, naphthylene diisocyanate, and diphenylmethane diisocyanate.

Examples of suitable acyclic aliphatic diisocyanates for blocking are trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimeric fatty acids, as marketed under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, especially hexamethylene diisocyanate.

Examples of suitable cycloaliphatic diisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate, liquid bis(4-isocyanatocyclohexyl)methane with a trans/trans content of up to 30% by weight, preferably 25% by weight, and in particular 20% by weight, as described in patents DE 44 14 032 A1, GB 1220717 A1, DE 16 18 795 A1 or DE 17 93 785 A1, especially isophorone diisocyanate.

Examples of suitable polyisocyanates for blocking are polyurethane prepolymers which contain isocyanate groups, which may be prepared by reacting polyols with an excess of the above-described aromatic, aliphatic and cycloaliphatic, preferably aliphatic and cycloaliphatic, diisocyanates and which are preferably of low viscosity. In the context of the present invention, the term "cycloaliphatic diisocyanate" denotes a diisocyanate in which at least one isocyanate group is attached to a cycloaliphatic radical.

It is also possible to use polyisocyanates containing isocyanurate, biuret, allophanate, iminooxadiazinedione, urethane, urea, carbodiimide and/or uretdione groups, which are prepared in a customary and known manner from the diisocyanates described above. Examples of suitable preparation processes and polyisocyanates are known, for example, from the patents and patent applications CA 2,163, 591 A1, U.S. Pat. Nos. 4,419,513 A1, 4,454,317 A1, EP 0 646 608 A1, U.S. Pat. No. 4,801,675 A1, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A1, 5,290,902 A1, EP 0 649 806 A1, DE 42 29 183 A1, and EP 0 531 820 A1.

Also suitable, furthermore, are low molecular mass compounds, oligomeric compounds and polymeric compounds which contain isocyanate groups and groups activated with actinic radiation, especially UV light or electron beams. Examples of suitable compounds of this kind are the urethane (meth)acrylates described in European Patent Application EP 0 928 800 A1, which contain (meth)acrylate groups and free isocyanate groups.

In the context of the present invention, the term oligomers, hereinbelow, refers to resins containing at least 2 up to 15 monomer units in their molecule. In the context of the present invention, polymers are resins which contain at least 10 monomer units in their molecule. For further details of these terms, reference is made to Römpp Lexikon Lacke und Druckfarben, Georg Thieme Verlag, Stuttgart, New York, 1998, "Oligomers", page 425.

Particular preference is given to the use of oligomers, preferably trimers, especially the isocyanurate, of hexamethylene diisocyanate.

Examples of suitable customary and known blocking agents are those known from U.S. Pat. No. 4,444,954:

i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam, or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxy-methanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol, or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol, or ethylthiophenol;

vi) acid amides such as acetoanilide, acetoanisidinamide, acrylamide, methacrylamide, acetamide, stearamide, or benzamide;

vii) imides such as succinimide, phthalimide, or maleimide;

viii) amines such as diphenylamine, phenylnaphthylamine, xylidine, N-phenylxylidine, carbazole, aniline, naphthylamine, butylamine, dibutylamine, or butylphenylamine;

ix) imidazoles such as imidazole or 2-ethylimidazole;

x) ureas such as urea, thiourea, ethyleneurea, ethylenethiourea, or 1,3-diphenylurea;

xi) carbamates such as phenyl N-phenylcarbamate or 2-oxazolidone;

xii) imines such as ethylenimine;

xiii) oximes such as acetone oxime, formaldoxime, acetaldoxime, acetoxime, methyl ethyl ketoxime, diisobutyl ketoxime, diacetyl monoxime, benzophenone oxime, or chlorohexanone oxime;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles such as 3,5- or 3,4-dimethylpyrazole, imidazoles, or triazoles.

These customary and known blocking agents are used, however, only in minor amounts. This means that the essential performance properties of the blocked polyisocyanates (A), such as the baking temperature, for example, are determined primarily by the isocyanate groups blocked with propargyl alcohol.

In terms of method, the blocking has no special features, but instead takes place by stoichiometric reaction of the blocking substrates—the diisocyanates and polyisocyanates—with the propargyl alcohol for use in accordance with the invention, in the melt or in at least one organic solvent that is essentially inert toward isocyanates, preferably under an inert gas atmosphere and in the presence of an appropriate catalyst such as an organotin compound, as described for example in European Patent EP 0 159 117 B1 or in German Patent Application DE 44 41 418 A1 for 3,5-dimethylpyrazole.

On the basis of their particular advantageous performance properties, the blocked polyisocyanates (A) are suitable for all utilities in which blocked diisocyanates and polyisocyanates are commonly used.

Thus they are suitable—as already described above—as intermediates for the synthesis of mixed-blocked or higher-functional blocked polyisocyanates (A). They may also be used as monomers to prepare oligomers and polymers.

Preferably, they are used as reactive constituents in the compositions of the invention.

The compositions of the invention are reactive. This means that they are stable on storage at room temperature for a greater or lesser period of time, preferably for at least 6 hours in the case of two-component or multicomponent systems or for at least several weeks, in particular for at least one year, in the case of one-component systems, and only when energy, especially thermal energy, is supplied react to give the desired end products.

In principle, the compositions of the invention may be used for all utilities where such behavior is a prerequisite. This is the case, for example, in the production of information carriers such as thermally writable laser-optical disks, resists, and printing plates.

However, the compositions of the invention are used preferably as coating materials, adhesives, and sealing compounds. With particular preference they are used as coating materials of the invention.

The comments made below in relation to the coating materials of the invention apply to the compositions of the invention whatever their application, and, mutatis mutandis, to the adhesives and sealing compounds of the invention.

The amounts of the blocked polyisocyanates (A) in the coating materials of the invention may vary extremely widely. Since the blocked polyisocyanates (A) are able to replace fully the conventional blocked diisocyanates and polyisocyanates in the function of crosslinking agents for thermally curable coating materials, they may be employed in the customary amounts known from the prior art. However, owing to their advantageous performance properties, they may often be used in smaller amounts. On the other hand, owing to their ability to crosslink subsequently on exposure to actinic radiation, they may be used in a quantitative excess over the binders and reactive diluents (B). Preferably, they are used in an amount of from 5 to 70, more preferably from 6 to 67, with particular preference from 7 to 63, with very particular preference from 8 to 60, and in particular from 9 to 57% by weight, based in each case on the solids of the coating material of the invention.

The coating materials of the invention comprise at least one constituent (B) which contains on average at least two isocyanate-reactive functional groups in the molecule. It is preferably at least one binder and/or at least one reactive diluent (B).

The coating materials of the invention comprise customary and known binders (B) as described, for example, in Römpp Lexikon Lacke und Druckfarben, Georg Thieme Verlag, Stuttgart, New York, 1998, under the headword "Binders", pages 73 and 74. Appropriate binders are random, alternating and/or block, linear and/or branched and/or comb, oligomeric or polymeric addition (co) polymers of ethylenically unsaturated monomers, or polyaddition resins and/or polycondensation resins, as described in Römpp Lexikon Lacke und Druckfarben, Georg Thieme Verlag, Stuttgart, New York, 1998, page 457: "Polyaddition" and "Polyaddition resins (polyadducts)", pages 463 and 464: "Polycondensates", "Polycondensation" and "Polycondensation resins". The binders comprise the above-described isocyanate-reactive functional groups. They may additionally comprise further reactive functional groups which are able to enter into thermally initiated crosslinking reactions with the complementary reactive functional groups of the customary and known crosslinking agents that may be present, as described below. In addition, they may comprise groups activatable with actinic radiation, such as acrylate groups.

In addition to the above-described oligomeric or polymeric binders (B), or instead of these, the coating material of the invention comprises at least one low molecular mass compound and/or a comparatively low molecular mass oligomer. These compounds and oligomers are also referred to as reactive diluents (B).

Examples of suitable reactive diluents (B) are the polyhydroxy- and/or polythiol-functionalized cyclic and/or acyclic alkanes having 9 to 16 carbon atoms in the molecule, such as the positionally isomeric diethyloctanediols, as described in German Patent Application DE 198 09 643 A1, the hyperbranched compounds having a tetrafunctional central group, as described in German Patent Application DE 198 40 605 A1, or the hydroformylated and hydrogenated oligomers, obtainable by metathesis of acyclic monoolefins and cyclic monoolefins, hydroformylation of the resultant oligomers, and subsequent hydrogenation, as described in German Patent Application DE 198 05 421 A1.

This variant of the coating material of the invention is employed in particular when its solid content is to be particularly high, for example, up to 100% by weight in the case of the liquid 100% systems.

The amount of these binders and/or reactive diluents (B) in the coating compositions of the invention may likewise vary extremely widely and is guided in particular by the functionality of the binders and/or reactive diluents, on the one hand, and of the blocked polyisocyanates (A), on the other. The amount is preferably from 30 to 95, more preferably from 33 to 94, with particular preference from 37 to 93, with very particular preference from 40 to 92, and in particular from 43 to 91% by weight, based in each case on the solids of the coating material of the invention.

Furthermore, the coating material of the invention comprises at least one catalyst (C) for the thermal crosslinking.

The catalyst (C) for inventive use controls the crosslinking reaction in such a way that in the course of the thermal cure it does not proceed "conventionally" with elimination of the propargyl alcohol from the blocked polyisocyanates of the invention and reaction of the deblocked isocyanate groups with the isocyanate-reactive groups in the binders and/or reactive diluents (B), with the formation of urethane, thiourethane and/or urea groups, especially urethane groups.

Instead, in the curing process of the invention, the catalysts (C) control the crosslinking reaction such that in the context of the thermal cure it proceeds predominantly or completely in the sense of the addition reaction of the isocyanate-reactive groups of the binders and/or reactive diluents (B) with the propargyl groups of the blocked polyisocyanates (A) with the formation of vinyl ethers, vinyl thioethers and/or enamines, especially vinyl ether groups.

The resultant coatings of the invention are further distinguished by the fact that, owing to the vinyl groups they contain, they can be postcrosslinked with actinic light. By actinic light is meant electromagnetic radiation such as near infrared, visible light or UV light, especially UV light, and corpuscular radiation such as electron beams.

Examples of suitable catalysts (C) are catalytically active organometallic chelates such as zinc acetylacetonate;

alkali metal hydroxides such as NaOH or KOH;

alkali metal alkoxides such as sodium or potassium ethoxide, isopropoxide or tert-butoxide;

onium salts such as ammonium, phosphonium or sulfonium salts, preferably the fully alkylated and/or arylated ammonium, phosphonium or sulfonium salts, especially the N,N,N,N-tetramethyl-, tetraethyl-, -tetrapropyl- or -tetrabutylammonium salts or N,N,N-trimethyl-N-cetylammonium salts, triethylphenylphosphonium salts or tributylsulfonium salts with hydroxide ions and/or halide ions, especially chloride ions or bromide ions, as counterions;

quaternary ammonium salts prepared from epoxides or epoxy resins and tertiary amines, or ternary sulfonium salts prepared from epoxides or epoxy resins and secondary sulfides.

Very particular preference is given to the use of N,N,N-trimethyl-N-cetylammonium bromide.

The catalysts (C) are preferably present in the coating materials of the invention in an amount of from 0.01 to 5, more preferably from 0.05 to 4.5, with particular preference from 0.1 to 4, with very particular preference from 0.5 to 4, and in particular from 0.7 to 3.5% by weight, based in each case on the solids of the coating material of the.invention.

Furthermore, the coating materials of the invention may comprise minor amounts of customary and known crosslinking agents, which means that the blocked polyisocyanates (A) continue to determine primarily the curing properties of the coating materials.

Examples of suitable additional crosslinking agents are amino resins, as described for example in Römpp Lexikon Lacke und Druckfarben, Georg Thieme Verlag, 1998, page 29, "Amino resins", in the text book "Lackadditive" [Coatings additives] by Johan Bieleman, Wiley-VCH, Weinheim, N.Y., 1998, pages 242 ff., in the book "Paints, coatings and solvents", second, completely revised edition, edited by D. Stoye and W. Freitag, Wiley-VCH, Weinheim, N.Y., 1998, pages 80 ff., in the patents U.S. Pat. No. 4,710,542 A1 or EP-B-0 245 700 A1, and in the article by B. Singh and coworkers, "Carbamylmethylated melamines, novel crosslinkers for the coatings industry" in Advanced Organic Coatings Science and Technology Series, 1991, Volume 13, pages 193 to 207; carboxyl-containing compounds or resins, as described for example in the patent DE 196 52 813 A1; compounds and resins containing epoxide groups, as described for example in the patents EP 0 299 420 A1, DE 22 14 650 B1, DE 27 49 576 B1, U.S. Pat. Nos.

4,091,048 A1 or 3,781,379 A1; blocked polyisocyanates, as described for example in the patents U.S. Pat. No. 4,444,954 A1, DE 196 17 086 A1, DE 196 31 269 A1, EP 0 004 571 A1 or EP 0 582 051 A1; tris(alkoxycarbonylamino)triazines, as described in the U.S. Pat. Nos. 4,939,213 A1, 5,084,541 A1, 5,288,865 A1 or EP 0 604 922 A1; and/or the higher-functional polyisocyanates described above.

The coating compositions of the invention may further comprise at least one additive.

Examples of suitable additives are organic and inorganic color and/or effect pigments, organic and inorganic fillers, reactive diluents curable with actinic radiation (cf. Römpp Lexikon Lacke und Druckfarben, Stuttgart, N.Y., 1998, page 491), low-boiling organic solvents and/or high-boiling organic solvents ("long solvents"), binders curable with actinic radiation, UV absorbers, light stabilizers, free-radical scavengers, thermally unstable free-radical initiators, photoinitiators, crosslinking catalysts, devolatilizers, slip additives, poly-merization merization inhibitors, defoamers, emulsifiers, wetting agents, adhesion promoters, leveling agents, film-forming auxiliaries, rheology control additives, and flame retardants. Further examples of suitable coating additives are described in the text book "Lackadditive" by Johan Bieleman, Wiley-VCH, Weinheim, N.Y., 1998.

As already remarked above, the coating materials of the invention may be one-component systems or two-component or multicomponent systems. They are preferably one-component systems.

Furthermore, the coating materials of the invention may be essentially free of water and/or organic solvents and may be in powder form or liquid (100% systems). In the context of the present invention, "essentially free" means that the amount of water and/or organic solvents is less than 5.0, preferably less than 3.0, more preferably less than 2.0, with particular preference less than 1.0, and with very particular preference less than 0.5% by weight, and in particular below the gas-chromatographic detection limit. In this form they may be used, for example, as powder surfacers, powder basecoats, powder clearcoats or liquid clearcoats.

Alternatively, the coating material in question may be a water-based coating material, especially an electrodeposition coating material, an aqueous surfacer, an aqueous basecoat, an aqueous clearcoat, or an aqueous powder coating dispersion (unpigmented powder slurry clearcoat or pigmented powder slurry basecoat).

Not least, the coating material of the invention may also comprise a conventional—in this context, i.e., organic-solventborne—coating material, such as a conventional surfacer, basecoat or clearcoat.

The preparation of the coating materials of the invention has no particular features but instead takes place in a customary and known manner by mixing of the above-described constituents in appropriate mixing equipment, such as stirred vessels, dissolvers, stirred mills, static mixers, toothed-wheel dispersers or extruders, by the techniques suitable for preparing the respective coating materials.

The coating materials of the invention may be applied by all customary methods of application, such as electrodeposition coating, spraying, knifecoating, brushing, flow coating, dipping, impregnating, trickling, or roller coating, for example. The substrate to be coated may be itself at rest, with the application device or unit being moved. Alternatively, the substrate to be coated, in particular a coil, may be moved, with the application unit being at rest relative to the substrate or being moved in an appropriate way.

The thermal curing of the applied coating materials of the invention likewise has no special features as to its method but instead takes place in a customary and known manner by heating with infrared or near-infrared radiation or with hot air blowers, with or without the assistance of exposure to actinic radiation, if the coating materials of the invention include appropriate constituents.

In this case, the particular advantage of the coating materials of the invention is manifested to a particular extent, namely that the thermal crosslinking takes place completely even at temperatures below 160, preferably 150, and in particular 140° C., thereby permitting the coating of comparatively heat-sensitive substrates.

The basecoats and/or clearcoats of the invention are outstandingly suitable for producing multicoat color and/or effect coating systems of the invention by the wet-on-wet technique, where a basecoat film is applied, dried and overcoated with a clearcoat film, after which basecoat film and clearcoat film are cured together. As is known, this technique is employed with advantage in the OEM finishing and refinishing of motor vehicles.

The pigmented powder slurries of the invention are outstandingly suitable for producing combination effect coats. These are coatings which in a color and/or effect coating system fulfil at least two functions. Functions of this kind are, in particular, corrosion protection, adhesion promotion, the absorption of mechanical energy, and the provision of color and/or effect. In accordance with the invention, the combination effect coat serves above all to absorb mechanical energy and to provide color and/or effect at the same time; it therefore fulfils the functions of a surfacer coat or antistonechip primer and of a basecoat. Preferably, furthermore, the combination effect coat also possesses corrosion protection and/or adhesion promotion activity.

Furthermore, however, owing to their particularly advantageous properties, the coating materials of the invention are also appropriate for the coating of interior and exterior constructions, for the coating of furniture, windows or doors, and for industrial coating, including coil coating, container coating, and the impregnation or coating of electrical components. In the context of industrial coating, they are suitable for coating virtually all parts for domestic or industrial use, such as radiators, domestic appliances, small metal parts such as nuts and bolts, wheel caps, rims, packaging, or electrical components such as motor windings or transformer windings.

The adhesives and sealing compounds of the invention are outstandingly suitable for the production of adhesive films and seals of especially high, long-term bond strength and sealing capacity even under extreme and/or rapidly changing climatic conditions.

Accordingly, the primed or unprimed substrates commonly employed in the abovementioned technological fields, comprising metal, glass, plastic, textile, wood, paper, cardboard or mineral materials of construction, or composites of these materials, that are coated with at least one coat of the invention, bonded with at least one adhesive film of the invention, and/or sealed with at least one seal of the invention, combine a particularly advantageous profile of performance properties with a particularly long service life, which makes them particularly attractive from an economic standpoint.

EXAMPLES

Preparation Example 1

The Preperation of the Binder 1

In a reactor equipped with a stirrer, reflux condenser, internal thermometer and an inert gas line, 4484 parts by weight of epoxy resin based on bisphenol A and having an epoxy equivalent weight (EEW) of 188 g/eq, together with 1249 parts by weight of bisphenol A, 485 parts by weight of dodecylphenol and 330 parts by weight of xylene, were heated to 130° C. under a nitrogen atmosphere. Subsequently, 10 parts by weight of N,N-dimethylbenzylamine were added, whereupon the temperature of the reaction mixture rose briefly to 160° C. After the temperature of the reaction mixture had fallen back to 130° C., a further 6 parts by weight of N,N-dimethylbenzylamine were added and the reaction mixture was held at 130° C. until the EEW had a value of 1010 g/eq.

Then, with cooling, 144 parts by weight of butyl glycol, 474 parts by weight of dimethylethanolamine, 763 parts by weight of xylene and 294 parts by weight of sec-butanol were added. After the temperature of the solution had fallen to 90° C., the solution was held at this temperature for one hour. Subsequently, further cooling was carried out, and 288 parts by weight of propylene glycol phenyl ether and 695 parts by weight of sec-butanol were added. At 60° C., 148 parts by weight of N,N-dimethylaminopropylamine were added.

The resultant binder solution was held at 60° C. for 2 hours. It was then heated at 90° C. for one hour until its viscosity remained constant. After brief cooling, it was discharged. Its characteristic data were as follows:

| | |
|---|---|
| Solids content: | 72% by weight (1 h/130° C.) |
| Base content: | 1.03 Meq/g |
| Viscosity: | 3.4 dPas (40% strength by weight in propylene glycol methyl ether; cone-and-plate viscometer at 23° C.). |

Preparation Example 2
The Preparation of the Binder 2

A reactor was charged under a nitrogen atmosphere with 576 parts by weight of 1,4-cyclohexanedimethanol and 290 parts by weight of methyl ethyl ketone, and this initial charge was heated to 45° C. 0.6 part by weight of dibutyltin dilaurate was added to the resultant clear solution. Then 582 parts by weight of trimerized hexamethylene diisocyanate of the isocyanurate type with an isocyanate equivalent weight of 194 g/eq (Basonat® HI 100 from BASF Aktiengesellschaft) were run in at a rate such that the temperature of the reaction mixture did not exceed 65° C. After the end of this addition the reaction mixture was held at 65° C., for one hour. Subsequently, isocyanate groups were no longer detectable. The solution of the oligomeric binder had a theoretical solids content of 80% by weight. The hydroxy equivalent weight was 232 g/eq.

Preparation Example 3
The Preparation of a Blocked Polyisocyanate (A)

A reactor equipped with a stirrer, reflux condenser, internal thermometer and an inert gas line was charged with 1022 parts by weight of trimerized hexamethylene diisocyanate of the isocyanurate type with an isocyanate equivalent weight of 194 g/eq (Basonat® HI 100 from BASF Aktiengesellschaft) under a nitrogen atmosphere. 146 parts by weight of methyl isobutyl ketone and 0.5 part by weight of dibutyltin dilaurate were added and the resultant solution was heated to 42° C. Then 295 parts by weight of propargyl alcohol were added dropwise at a rate such that the temperature of the solution remained below 65° C. After the end of the addition, the temperature of the reaction mixture was held at 65° C. for 2 hours. Subsequently, free isocyanate groups were no longer detectable. The reaction mixture was cooled to 50° C. and diluted simultaneously with 182.8 parts by weight of methyl isobutyl ketone. Its solids content was 80% by weight.

Comparative Tests T1

The Preparation of a Clearcoat Material of the Invention and of a Clearcoat of the Invention A clearcoat material comprising 48.6 parts by weight of the binder solution from Preparation Example 1, 18.8 parts by weight of the blocked polyisocyanate (A) from Preparation Example 3 and 32.6 parts by weight of sec-butanol was knife-coated onto phosphated steel panels using a box-type coating bar with a wet-film thickness of 100 μm. The clearcoat films were left to evaporate for 30 minutes and then baked at 160, 180 and 200° C. for 20 minutes. Subsequently, the quality of the crosslinking was tested on the basis of the solvent resistance, by abrading the clearcoats with a cloth soaked with methyl isobutyl ketone, along the lines of the MEK test. 100 double strokes were used in each case. The degree of destruction of the clearcoats was assessed visually and rated as follows:

| Rating | Signification |
|---|---|
| 0 | very good/no traces of damage |
| 1 | good/slight loss of gloss |
| 2 | satisfactory/wipe marks |
| 3 | visible damage to the film |
| 4 | deficient/traces of abrasion through to the metal, but still no complete detachment |

The clearcoats baked at 160° C. received the rating 4, those baked at 180° C. the rating 3, and those baked at 200° C. the rating 2.

The baking loss, i.e., the percentage difference between the solids determined at the baking temperature and the solids determined at 130° C., was determined using an initial sample weight of 1 g in each case. The duration of heating was 1 h in each case.

Even at a baking temperature of 200° C., the clearcoat showed no baking loss.

Comparative Tests T2 to T4

The Preparation of Clearcoat Materials and Clearcoats of the Invention

Comparative Test T1 was repeated except that the clearcoat was further admixed in Comparative Test T2 with 1 part by weight of a commercial bismuth salt (K-Kat from King Industries), in Comparative Test T3 with 1 part by weight of a commercial solution of lead octoate, and in Comparative Tests T4 with 0.75 part by weight of dibutyltin dioxide.

Table 1 gives an overview of the solvent resistance and the baking loss.

TABLE 1

Solvent resistance and baking loss
(Comparative Tests T2 to T4)

| Parameter | Comparative Tests | | |
|---|---|---|---|
| | T2 | T3 | T4 |
| Solvent stability (rating) | | | |
| 160° C. | (a) | (b) | 1 |
| 180° C. | 0 | 0 | 0 |
| 200° C. | n.m. | n.m. | n.m. |
| Baking loss (%) | | | |
| 160° C. | — | — | 3.4 |
| 180° C. | 4.9 | 6.5 | 4.9 |
| 200° C. | n.m. | n.m. | n.m. |

(a) only 60 double strokes possible
(b) only 50 double strokes possible
n.m. not measured As underlined by the baking loss, the clearcoats have not been crosslinked in accordance with the curing process as claimed in the invention. The crosslinking temperatures were comparatively high. The clearcoats were clear and showed no surface defects.

Examples 1 to 3
The Preparation of Clearcoat Materials and Clearcoats of the Invention Comparative Test T1 was repeated except that the clearcoat was further admixed
  in Example 1 with 0.75 part by weight of zinc acetylacetonate,
  in Example 2 with 0.75 part by weight of a 48% strength aqueous solution of KOH, and
  in Example 3 with 0.75 part by weight of N,N,N-trimethyl-N-cetylammonium bromide.

Table 2 gives an overview of the solvent resistance and the baking loss.

TABLE 2

Solvent resistance and baking loss
(Examples 6 to 8)

| Parameter | Examples | | |
|---|---|---|---|
| | 1 | 2 | 3 |
| Solvent stability (rating) | | | |
| 160° C. | 1 | 0 | 0 |
| 180° C. | 0 | 0 | 0 |
| 200° C. | n.m. | n.m. | n.m. |
| Baking loss (%) | | | |
| 160° C. | 0.2 | 1.2 | 2.0 |
| 180° C. | 2.0 | 3.0 | 3.0 |
| 200° C. | n.m. | n.m. | n.m. |

As underlined by the baking loss, the clearcoats have been crosslinked in accordance with the curing process as claimed in the invention. Indeed, the respective baking loss corresponded approximately to the amount of catalyst used. They were clear and showed no surface defects. It is noteworthy that the maximum solvent stability was reached at a temperature of just 160° C.

As shown by a more in-depth investigation of the clearcoat material and of the clearcoat of Example 3, the clearcoat scored rating 1 solvent stability at a baking temperature of just 120° C.; the rating 0 was attained at just 130° C. This underlined the fact that the clearcoat material of the invention from Example 3 may be baked even at this comparatively low temperature. This was also demonstrated by means of dynamic mechanical analysis (DMA), as described in detail in German Patent Application DE 197 09 465 A1, on a glass fiber mesh soaked with the clearcoat of the invention from Example 3. The investigation indicated commencement of crosslinking at 122° C. (onset temperature, tan delta) or 123° C. (onset temperature, E' modulus). A perceptible baking loss did not occur until 150° C. (0.8%); at 200° C. it was only 2.9%.

Example 4
The Preparation and Crosslinking of a Clearcoat Material of the Invention and of a Clearcoat of the Invention with N,N,N-trimethyl-N-cetylanmonium Bromide and NaOH as Catalyst The clearcoat material was prepared by mixing 546 parts by weight of the binder solution from Preparation Example 2, 589 parts by weight of the blocked polyisocyanate (A) from Preparation Example 3, 274 parts by weight of sec-butanol, 45 parts by weight of solvent naphtha, 30 parts by weight of butyl glycol acetate, 13 parts by weight of N,N,N-trimethyl-N-cetylammonium bromide, 2 parts by weight of NaOH (50% strength in water) and one part by weight of a commercial leveling agent (Byk® 0.333 from Byk Chemie GmbH). It was sprayed using a pneumatic gravity-feed gun onto bright mirror metal panels so as to give dry film thicknesses of from 40 to 50 μm. Subsequently, the clearcoat films were flashed off for 10 minutes, predried at 80° C. for 10 minutes, and baked at 150° C. for 30 minutes.

This gave transparent clearcoats having a solvent resistance corresponding to a rating of 0 (cf. Example 2) and a micro-scale penetration hardness of 116 N/mm$^2$ (Fischerscope H100V, Vickers diamond pyramid; universal hardness of 25.6 mN).

Directly following its removal from the baking oven one of the coated mirror panels was irradiated in a UV tunnel at 1200 mJ/cm$^2$. The panel temperature at this time was still 120° C. After cooling, testing for solvent resistance still gave a rating of 0. The micro-scale penetration hardness had risen significantly to 154 N/mm$^2$ (universal hardness of 25.6 mN). This demonstrates that the clearcoats produced in accordance with the curing process as claimed in the invention may be advantageously postcrosslinked with UV light.

What is claimed is:

1. A reactive composition comprising
   (A) at least one polyisocyanate whose isocyanate groups have been at least partly blocked with propargyl alcohol,
   (B) at least one constituent that contains on average at least two isocyanate-reactive functional groups in the molecule, and
   (C) at least one thermal crosslinking catalyst that catalyzes the addition reaction of the isocyanate-reactive functional groups of the at least one constituent with the acetylenically unsaturated triple bond of the propargyl alcohol.

2. The reactive compositions of claim 1, wherein the least partly blocked polyisocyanate is at least one of
   i) an aromatic diisocyanate,
   ii) an aliphatic diisocyanate,
   iii) a cycloaliphatic diisocyanate,
   iv) a polyurethane prepolymer comprising a reaction product of at least one of an aromatic isocyanate, an aliphatic isocyanate, and a cycloaliphatic diisocyanate, v) a polyisocyanate, an aliphatic isocyanate, and a cycloaliphatic diisocyanate, an allophanate group, an iminoxadiazinedione group, a urethane group, a urea group, a carbodiimide group, and a uretdione group, and vi) a urethane (meth)acrylate that contains (meth)acrylate groups and free isocyanate groups.

3. The reactive composition of claim 1, wherein the at least one constituent is selected from the group consisting of binders, reactive diluents, and mixtures thereof.

4. The reactive composition of claim 3, wherein

A. the binders are selected from the group consisting of
  i) addition (co)polymers of ethylenically unsaturated monomers that are at least one of random, alternating, block, linear, branched, comb, oligomeric, and polymeric,
  ii) polyaddition resins,
  iii) polycondensation resins, and
  iv) and combinations thereof; and B. the reactive diluents are selected from the group consisting of
  i) alkanes having from 9 to 16 carbon atoms in the molecule that are at least one of a polyhydroxy-functionalized cyclic alkane, a polyhydroxy-functionalized acyclic alkane, a polythiol-functionalized cyclic alkane, and a polythiol-functionalized acyclic alkane,
  ii) hyperbranched compounds having a tetrafunctional central group,
  iii) hydromformylated and hydrogenated oligomers prepared by a process comprising metathesising at least one of an acyclic monoolenfin and a cyclic monoolefin to form an oligomer, hydroformylating the oligomer, and subsequently hydrogenating the hydroformylated oligomer, and
  iv) combinations thereof.

5. The reactive composition of claim 1, wherein the isocyanate-reactive functional groups are selected from the group consisting of primary amino groups, primary hydroxyl groups, primary thiol groups, end combinations thereof.

6. The reactive composition of claim 1, wherein the at least one catalyst is selected from the group consisting of catalytically active organometallic chelates, alkali metal hydroxides, alkali metal alkoxides, onium salts, quaternary ammonium salts, ternary sulfonium salts, and combinations thereof.

7. The reactive composition of claim 6, wherein at least one of i) the catalytically active organometallic chelate is zinc acetylacetonate;

ii) the alkali metal hydroxide is at least one of NaOH and KOH;

iii) the alkali metal alkoxides are selected from the group consisting of sodium ethoxide, potassium ethoxide, sodium isopropoxide, potassium isopropoxide, sodium tert-butoxide, potassium tert-butoxide, and combinations thereof;

iv) the onium salts are selected from the group consisting of ammonium salts, phosphonium salts, sulfonium salts, and combinations thereof;

v) the quatenary ammonium salts are selected from the group consisting of quaternary ammonium salts that are prepared from at least one of epoxides and tertiary amines, and epoxy resins and tertiary amines; and vi) the ternary sulfonium salts are selected from the group consisting of ternary sulfonium salts that are prepared from at least one of epoxides end secondary sulfides, and epoxy resins and secondary sulfides.

8. A reactive composition (A) at least one polyisocyanate whose isocvante groups have been at least partly blocked with propargyl alcohol, (B) at least one constituent that contains on average at least two isocyanate-reactive functional groups in the molecule, and (C) at least one catalyst that catalyzes the addition reaction of the isocyanate-reactive functional groups of the at least one constituent with the acetylenically unsaturated triple bond of propargyl, alcohol, wherein the at least one catalyst is an onium salts, and wherein the onium salts is selected from group consisting of the N,N,N,N-tetramethyl-ammonium salts, N,N,N,N-tetraetbyl-ammonium salts, N,N,N,N-tetrapropyl-ammonium salts, N,N,N,N-tetrabutyl-ammonium salts, N,N,N-trimethyl-N-cetylammonium salts, triethylphenylphosphonium salts, tributylsulfonium salts, and combinations thereof, and wherein the counterion of these salts is at least one of a hydroxyl and a halide.

9. The reactive composition of claim 8, wherein the onium salt is N,N,N-trimethyl-N-cetylammonium bromide.

10. The reactive composition of claim 1, wherein the reactive composition is one of a coating material, an adhesive, and a sealing compound.

11. A process for producing a composition that is one of a coating, an adhesive film, and a seal comprising (I) applying at least one reactive composition of claim 1, at least one of onto and into a substrate, and (II) thermally curing the reactive compositions.

12. The process of claim 11, wherein on thermal curing, the least one polyisocyanate reacts with the constituent at least predominantly in the sense of an addition of the isocyanate-reactive functional groups onto the propargyl groups with the formation of at least one of a vinyl ether group, a vinyl thioether group, and an enamine group.

13. The proceas of claim 12, wherein at least one of the vinyl ether group, the vinyl thioether group, and the enamine group is crosslinked by exposure to actinic radiation.

14. The process claim 11, wherein the thermal curing fully cures reactive compositions.

15. The reactive composition of claim 1 wherein when the isocyanate-reactive groups are thiol groups, there are only two thiol groups in the molecule.

* * * * *